(12) United States Patent
Kwon et al.

(10) Patent No.: US 10,669,406 B2
(45) Date of Patent: Jun. 2, 2020

(54) LATEX COMPOSITION FOR DIP MOLDING AND MOLDED ARTICLE MANUFACTURED THEREFROM

(71) Applicant: LG Chem, Ltd., Seoul (KR)

(72) Inventors: Won Sang Kwon, Daejeon (KR); Seung Uk Yeu, Daejeon (KR); Jung Su Han, Daejeon (KR); Seung Hun Yang, Daejeon (KR)

(73) Assignee: LG Chem, Ltd. (KR)

( * ) Notice: Subject to any disclaimer, the term of this patent is extended or adjusted under 35 U.S.C. 154(b) by 256 days.

(21) Appl. No.: 15/751,326

(22) PCT Filed: Oct. 5, 2016

(86) PCT No.: PCT/KR2016/011126
§ 371 (c)(1),
(2) Date: Feb. 8, 2018

(87) PCT Pub. No.: WO2017/069433
PCT Pub. Date: Apr. 27, 2017

(65) Prior Publication Data
US 2018/0230297 A1    Aug. 16, 2018

(30) Foreign Application Priority Data

Oct. 21, 2015   (KR) .......................... 10-2015-0146424

(51) Int. Cl.
| | |
|---|---|
| *C08L 9/04* | (2006.01) |
| *B29C 41/00* | (2006.01) |
| *C08L 33/26* | (2006.01) |
| *C08J 5/02* | (2006.01) |
| *B29C 41/02* | (2006.01) |
| *B29C 41/14* | (2006.01) |
| *C08K 5/00* | (2006.01) |

(52) U.S. Cl.
CPC .............. *C08L 9/04* (2013.01); *B29C 41/00* (2013.01); *B29C 41/02* (2013.01); *B29C 41/14* (2013.01); *C08J 5/02* (2013.01); *C08L 33/26* (2013.01); *C08J 2309/04* (2013.01); *C08J 2433/26* (2013.01); *C08K 5/0025* (2013.01)

(58) Field of Classification Search
CPC .................................. C08L 9/04; B29C 41/00
See application file for complete search history.

(56) References Cited

U.S. PATENT DOCUMENTS

| | | | |
|---|---|---|---|
| 5,910,533 A | 6/1999 | Ghosal et al. | |
| 6,271,300 B1 | 8/2001 | Ohsumi et al. | |
| 6,369,154 B1 | 4/2002 | Suddaby | |
| 2003/0143487 A1 | 7/2003 | Kondo et al. | |
| 2007/0104766 A1 | 5/2007 | Wang et al. | |
| 2007/0149694 A1 | 6/2007 | Krishnan | |
| 2008/0207809 A1 | 8/2008 | Koide | |
| 2009/0013446 A1 | 1/2009 | Suddaby et al. | |
| 2010/0056717 A1 | 3/2010 | Suddaby et al. | |
| 2013/0317131 A1 | 11/2013 | Scales et al. | |
| 2014/0302265 A1 | 10/2014 | Yang et al. | |
| 2015/0225553 A1 | 8/2015 | Yang et al. | |

FOREIGN PATENT DOCUMENTS

| | | |
|---|---|---|
| CN | 101743123 A | 6/2010 |
| CN | 103930479 A | 7/2014 |
| JP | H03047817 A | 2/1991 |
| JP | H0925454 A | 1/1997 |
| JP | H10237182 A | 9/1998 |
| JP | 2003021908 A | 1/2003 |
| JP | 2008138194 A | 6/2008 |
| JP | 2009155634 A | 7/2009 |
| JP | 2014530289 A | 11/2014 |
| KR | 20020016917 A | 3/2002 |
| KR | 20080105275 A | 12/2008 |
| KR | 20100014559 A | 2/2010 |
| KR | 20140141069 A | 12/2014 |
| KR | 20140141919 A | 12/2014 |
| KR | 20150019007 A | 2/2015 |
| KR | 20150023484 A | 3/2015 |
| WO | 2011068394 A1 | 6/2011 |

OTHER PUBLICATIONS

Search report from International Application No. PCT/KR2016/011126, dated Jan. 12, 2017.
Wu, X., et al., "The kinetics of poly(N-isopropylacrylamide) microgel latex formation." Colloid & Polymer Science, vol. 272, Issue 4, 1994, pp. 467-477.
Fulghum, et al., "Stimuli-Responsive Polymer Ultrathin Films with a Binary Architecture: Combined Layer-by-Layer Polyelectrolyte and Surface-Initiated Polymerization Approach", Macromolecules, vol. 41, No. 2, Jan. 2008, pp. 429-435.
Chinese Search Report for Application No. 201680050306.5 dated Sep. 16, 2019, 1 page.

*Primary Examiner* — Vickey Nerangis
(74) *Attorney, Agent, or Firm* — Lerner, David, Littenberg, Krumholz & Mentlik, LLP

(57) ABSTRACT

Disclosed is a latex composition for dip-molding and a dip-molded article produced therefrom. More specifically, by using a water-soluble polymer such as poly(N-isopropylacrylamide) or a copolymer thereof in combination with a carbonic acid-modified nitrile-based copolymer latex, the stability of the latex is improved through crosslinking by hydrogen bonding, it is possible to manufacture a molded article which has a slow syneresis and is excellent in workability and does not tear even at a thin thickness due to high tensile strength.

13 Claims, No Drawings

LATEX COMPOSITION FOR DIP MOLDING AND MOLDED ARTICLE MANUFACTURED THEREFROM

CROSS-REFERENCE TO RELATED APPLICATIONS

The present application is a national phase entry under 35 U.S.C. § 371 of International Application No. PCT/KR2016/011126 filed Oct. 5, 2016, which claims priority from Korean Patent Application No. 10-2015-0146424 filed Oct. 21, 2015, all of which are incorporated herein by reference.

TECHNICAL FIELD

The present disclosure relates to a latex composition for dip-molding and a dip-molded article produced therefrom, wherein the latex composition enables the production of a dip-molded article having slow syneresis, superior tensile strength.

BACKGROUND ART

Rubber gloves are used in a wide range of fields such as housework, food industry, electronics industry, and medical field. In the past, rubber gloves made by dip-molding of natural rubber latex were used, but the protein contained in natural rubber was problematic due to allergic reactions such as pain and rash to some users.

Because of this, many gloves made by dip-molding the latex composition in which sulfur and a vulcanization accelerator are mixed with a carbonic acid-modified nitrile-based copolymer latex such as an acrylic acid-acrylonitrile-butadiene copolymer latex, which does not cause an allergic reaction, were used.

The carbonic acid-modified nitrile-based copolymer latex has a certain ratio of acrylic acid, acrylonitrile and butadiene, that is, in the form of organic acid segments. In recent years, attempts have been made to add physical properties such as tensile strength and durability required as rubber gloves by adding a crosslinking agent to the latex.

For example, in WO 2011/068394, a method has been proposed in which acrylonitrile is carboxylated and a metal oxide such as zinc oxide or another metal salt is added thereto and crosslinked by ionic bonds therebetween. However, such crosslinking alone does not satisfy a sufficient level of tensile strength and durability, and a new problem occurs in that some metals remain in the final molded article, resulting in deterioration of physical properties and skin irritation.

Moreover, in order to increase productivity in the nitrile glove market, which is currently replacing natural rubber gloves, the goal is to manufacture thin, yet non-tearable gloves by raising the production line speed.

However, when the concentration of the latex composition is lowered to simply make the glove thin, there may be problems in workability when manufacturing gloves. Therefore, when the glove is manufactured, a technique for making a glove which is good in workability and has a high tensile strength and is not torn even when the thickness is thin is required.

PRIOR ART LITERATURE (Patent Document 1) WO 2011/068394, entitled "Vulcanization accelerators and sulfur-free elastic rubber and rubber products"

DISCLOSURE

Technical Problem

The present inventors have conducted a variety of studies to solve the above problems. As a result, we have found that poly(N-isopropylacrylamide) or a copolymer thereof, which is a water-soluble polymer, is selected as a crosslinkable material through hydrogen bonding, and have identified that slow syneresis and improved physical properties are achieved for the resulting dip-molded article when dip-molding mixed with latex is performed, thereby completing the invention.

Technical Solution

According to one aspect of the present disclosure, there is provided a latex composition for dip-molding which has increased syneresis time during the dip-molding process and exhibits excellent tensile strength, thereby reducing tearing even at a thin thickness.

According to another aspect of the present disclosure, there is provided a molded article produced from the above latex composition for dip-molding.

According to further aspect of the present disclosure, there is provided a method of producing a molded article by using the above latex composition for dip-molding.

The present disclosure provides a latex composition for dip-molding comprising a carbonic acid-modified nitrile-based copolymer latex and poly(N-isopropylacrylamide) or copolymers thereof.

Also, the present disclosure provides a dip-molded article produced by dip-molding of the above latex composition for dip-molding.

Further, the present disclosure provides a method of producing a dip-molded article including:

a) applying and drying a coagulant solution to a mold;
b) applying a latex composition for dip-molding to the coagulant-applied mold to form a dip-molded layer;
c) cross-linking the dip-molded layer; and
d) peeling off the cross-linked dip-molded layer from the mold to obtain a dip-molded article,
wherein the latex composition for dip-molding is a latex composition as described aforementioned.

Advantageous Effects

The latex composition for dip-molding according to the present invention makes it possible to produce a dip-molded article which is smooth in syneresis during dip-molding and excellent in workability and does not tear even at a thin thickness due to high tensile strength.

BEST MODE

A specific composition is added or a process parameter is changed in order to improve the physical properties and the dip-molding process of the final molded article in the production of a molded article such as a rubber glove through a dip-molding process. In the present disclosure, poly(N-isopropylacrylamide) or a copolymer thereof having a functional group capable of being hydrogen-bonded to a carbonic acid functional group well mixed with a latex is mixed with latex for dip-molding.

Latex Composition for Dip-Molding

A latex composition for dip-molding according to any embodiment of the present disclosure includes a carbonic acid-modified nitrile-based copolymer latex and an poly(N-isopropylacrylamide) or a copolymer thereof.

The carbonic acid-modified nitrile-based copolymer latex is prepared by adding an emulsifier, a reactive compound, a polymerization initiator, a molecular weight regulator and other additives to a monomer, followed by emulsion polymerization.

The monomer is composed of a conjugated diene-based monomer, an ethylenically unsaturated nitrile-based monomer, an ethylenically unsaturated acid monomer, and an unsaturated ethylenic monomer copolymerizable therewith.

A conjugated diene-based monomer, which is one monomer that constitutes a carbonic acid-modified nitrile-based copolymer latex according to any embodiment of the present disclosure, may include, for example, one or more selected from the group consisting of 1,3-butadiene, 2,3-dimethyl-1,3-butadiene, 2-ethyl-1,3-butadiene, 1,3-pentadiene and isoprene, and 1,3-butadiene and isoprene may be used, and for instance, 1,3-butadiene may be used.

The conjugated diene monomer is contained in an amount of 40 to 89% by weight, preferably 45 to 80% by weight, more preferably 50 to 78% by weight, based on the total monomers constituting the carbonic acid-modified nitrile-based copolymer. If the content of the conjugated diene monomer is less than 40% by weight, the resulting dip-molded article exhibits the problems such as becoming hard, poor wearing sensation. If the content exceeds 89% by weight, the resulting dip-molded article has poor oil resistance and decreased tensile strength.

An ethylenically unsaturated nitrile-based monomer, which is another monomer that constitutes a carbonic acid-modified nitrile-based copolymer latex according to any embodiment of the present disclosure, may include one or more selected from the group consisting of acrylonitrile, methacrylonitrile, fumaronitrile, α-chloronitrile, α-cyanoethyl acrylonitrile, and combinations thereof, and among these, acrylonitrile and methacrylonitrile may be used, and for instance, acrylonitrile may be used.

An ethylenically unsaturated nitrile-based monomer accounts for 10 to 50% by weight, for example, 15 to 45% by weight, or 20 to 40% by weight, based on total monomers constituting a carbonic acid-modified nitrile-based copolymer. If the amount is less than 10% by weight, the resulting dip-molded article has poor oil resistance and decreased tensile strength. On the contrary, if the amount is more than 50% by weight, the resulting dip-molded article exhibits the problems such as becoming hard, poor wearing sensation.

An ethylenically unsaturated acid monomer, which is another monomer that constitutes a carbonic acid-modified nitrile-based copolymer according to any embodiment of the present disclosure, has one or more acidic groups selected from the group consisting of a carboxyl group, a sulfonic acid group and an acid anhydride group. The above ethylenically unsaturated acid monomer may include, for example, an ethylenically unsaturated carbonic acid monomer such as acrylic acid, methacrylic acid, itaconic acid, maleic acid, fumaric acid, etc.; a polycarboxylic anhydride such as maleic anhydride, citraconic anhydride, etc.; an ethylenically unsaturated sulfonic acid monomer such as styrenesulfonic acid, etc.; an ethylenically unsaturated polycarbonic acid partial ester monomer such as monobutyl fumarate, monobutyl maleate, mono-2-hydroxypropyl maleate, etc., and methacrylic acid may be used. Such ethylenically unsaturated acid monomer may be used in the form of, for example, alkali metal salts or ammonium salts.

The above ethylenically unsaturated acid monomer accounts for 0.1 to 10% by weight, for example, 0.5 to 9% by weight, or 1 to 8% by weight, based on total monomers constituting a carbonic acid-modified nitrile-based copolymer. If the amount is less than 0.1% by weight, the resulting dip-molded article has decreased tensile strength. On the contrary, if the amount is more than 10% by weight, the resulting dip-molded article becomes hard and exhibits poor wearing sensation.

A carbonic acid-modified nitrile-based copolymer according to any embodiment of the present disclosure may optionally further include other ethylenically unsaturated monomer copolymerizable with the above ethylenically unsaturated nitrile monomer and ethylenic unsaturated acid monomer.

A copolymerizable ethylenically unsaturated monomer may include one or more a vinyl aromatic monomer selected from the group consisting of styrene, alkyl styrene and vinyl naphthalene; fluoroalkyl vinyl ether such as fluoro ethyl vinyl ether, etc.; an ethylenically unsaturated amide monomer selected from the group consisting of (meth)acrylamide, N-dimethylol (meth)acrylamide, N,N-dimethylol (meth)acrylamide, N-methoxymethyl (meth)acrylamide and N-propoxymethyl (meth)acrylamide; a nonconjugated diene monomer such as vinylpyridine, vinylnorbornene, dicyclopentadiene, 1,4-hexadiene, etc.; an ethylenically unsaturated carbonic acid ester monomer including methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, dimethylaminoethyl (meth)acrylate, etc.

The above other ethylenically unsaturated monomer copolymerizable with the above ethylenically unsaturated nitrile-based monomer and ethylenically unsaturated acid monomer may be used in an amount less than 20% by weight based on total monomers constituting a carbonic acid-modified nitrile-based copolymer; if the amount exceeds 20% by weight, the balance is not well maintained between soft wearing sensation and tensile strength.

A carbonic acid-modified nitrile-based copolymer latex according to any embodiment of the present disclosure may be produced by the addition of an emulsifier, a polymerization initiator, a molecular weight modifier, etc. to monomers constituting a carbonic acid-modified nitrile-based copolymer, followed by emulsion polymerization.

As for an emulsifier, an anionic surfactant, a nonionic surfactant, a cationic surfactant, an amphoteric surfactant, etc. may be used, but not particularly limited thereto. Among these, an anionic surfactant selected from the group consisting of alkylbenzene sulfonic acid salt, aliphatic sulfonic acid salt, sulfuric acid ester salt of higher alcohol, α-olefin sulfonic acid salt and alkyl ether sulfuric acid ester salt, may be used.

The amount of emulsifier used is 0.3 to 10 parts by weight, for example, 0.8 to 8 parts by weight, or 1.5 to 6 parts by weight, based on 100 parts by weight of monomers constituting a carbonic acid-modified nitrile-based copolymer. If the amount is less than 0.3 parts by weight, the stability at the time of polymerization is lowered. On the contrary, if the amount is more than 10 parts by weight, it may cause a problem of excessive foaming, thereby making it difficult to produce a dip-molded article.

As for a polymerization initiator, a radical initiator may be used, but not particularly limited thereto. Examples of a radical initiator may include one or more selected from the group consisting of inorganic peroxide such as sodium persulfate, potassium persulfate, ammonium persulfate, potassium perphosphate, hydrogen peroxide, etc.; organic peroxide such as t-butyl peroxide, cumene hydroperoxide, p-menthol hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxyisobutyrate, etc.; azobisisobutyronitrile, azobis-2,4-dimethylvaleronitrile, azobiscyclohexanecarbonitrile, and azobis isobutyric acid methyl, and among these, inorganic peroxide, for example, persulfates may be used.

The amount of polymerization initiator used is 0.01 to 2 parts by weight, for example, 0.02 to 1.5 parts by weight, based on 100 parts by weight of total monomers constituting a carbonic acid-modified nitrile-based copolymer. If the amount is less than 0.01 parts by weight, polymerization rate is lowered, thereby making it difficult to produce the final product. On the contrary, if the amount is more than 2 parts by weight, the polymerization rate becomes too fast, thereby making it difficult to control polymerization.

An activating agent may be used and may include one or more selected from the group consisting of sodium formaldehyde sulfoxylate, sodium ethylenediamine tetraacetate, ferrous sulfate, dextrose, sodium pyrophosphate and sodium sulfite.

As for a molecular weight regulator, its examples may include, but are not limited to, mercaptan such as α-methylstyrene dimer, t-dodecyl mercaptan, n-dodecyl mercaptan, octyl mercaptan, etc.; halogenated hydrocarbon such as carbon tetrachloride, methylene chloride, methylene bromide, etc.; sulfur-containing compound such as tetraethylthiuram disulfide, dipentamethylenethiuram disulfide, diisopropylkisantigen disulfide, etc.

Such molecular weight modifier may be used alone or in combination of two or more. Among these, mercaptan, for example, t-dodecyl mercaptan may be used. The amount of molecular weight modifier used may vary depending on its type, but it is, for example, 0.1 to 2.0 parts by weight, or 0.2 to 1.5 parts by weight, or 0.3 to 1.0 parts by weight, based on 100 parts by weight of total monomers constituting a carbonic acid-modified nitrile-based copolymer. If the amount is less than 0.1 parts by weight, the physical properties of the resulting dip-molded article are significantly deteriorated. On the contrary, if the amount is more than 2 parts by weight, the polymerization stability is lowered.

In addition, other additives, such as a chelating agent, a dispersing agent, a pH adjusting agent, an oxygen scavenger, a particle size regulating agent, an anti-aging agent, an oxygen scavenger, etc., may be added at the time of polymerization of a latex according to any embodiment of the present disclosure.

The method for introducing a monomer mixture constituting a carbonic acid-modified nitrile-based copolymer may include a method of introducing a monomer mixture into the polymerization reactor all at once, a method of continuously introducing a monomer mixture into the polymerization reactor, a method of introducing a portion of a monomer mixture into the polymerization reactor and supplying the remaining portion continuously to the polymerization reactor, and any of these methods may be used.

The polymerization temperature at the time of emulsion polymerization may be 10 to 90° C., for example, 20 to 75° C., but is not particularly limited thereto. The conversion at the time of terminating the polymerization reaction may be 90% or more, for example, 93% or more. Unreacted monomers are removed and the solid concentration and pH are adjusted to obtain a carbonic acid-modified nitrile-based copolymer latex.

Such carbonic acid-modified nitrile-based copolymer latex has a glass transition temperature of −50 to −15° C., for example, −45 to −20° C. If the glass transition temperature of the latex is less than the above ranges, the tensile strength is significantly lowered or the wearing sensation becomes worse due to the stickiness of a glove. On the contrary, if the glass transition temperature of the latex is more than the above ranges, undesirable cracks of a dip-molded article occur.

The average particle size of the carbonic acid-modified nitrile-based copolymer latex may be 90 to 200 nm. If the average particle size is less than the above-mentioned ranges, viscosity is increased and the dip-molded article becomes transparent, which is not preferable. On the contrary, if the average particle size is more than the above ranges, the production time is prolonged and the productivity is lowered, and the tensile strength is lowered after the production of the dip-molded article, which is not preferable.

The glass transition temperature may be adjusted depending on the amount of conjugated diene monomer, and the average particle diameter may be adjusted depending on the type and amount of emulsifier.

Particularly, in the present disclosure, a specific polymer is used for producing a dip-molded article of a carbonic acid-modified nitrile-based copolymer latex.

Such a polymer includes a functional group capable of hydrogen bonding with a carbonic acid functional group in a molecular structure, and may preferably be a poly(N-isopropylacrylamide) or a copolymer thereof containing a repeating unit represented by the following formula (1).

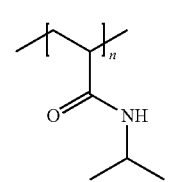

(1)

The repeating unit of the formula (1) includes an NH functional group in the molecular structure, and it exhibits crosslinking behavior by making oxygen (O) and hydrogen bonding (O . . . H) in the carbonic acid (C(=O)OH) of the latex. As a result, it is possible to increase the stability of the latex to increase the syneresis time in the dip-molding step, thereby improving the workability and productivity, and securing the advantage that the tensile strength of the finally obtained dip-molded article is increased.

The poly(N-isopropylacrylamide) copolymer is copolymerized with N-isopropylacrylamide monomer and other monomers having a carbonic acid functional group in the molecular structure, wherein the carbonic acid present in the copolymer also reacts with the carbonic acid of the latex and hydrogen so that the advantages mentioned above can be further secured.

The copolymerizable monomers that can be used are not limited to the present disclosure, and any of those containing an ethylenically unsaturated functional group and a carbonic acid in the molecular structure may be used. Typically, the copolymerizable monomer may be an ethylenically unsaturated carbonic acid monomer, it is possible to use one species selected from the group consisting of acid, itaconic acid, maleic acid, fumaric acid, and combinations thereof, more preferably methacrylic acid.

At this time, as the content of the ethylenically unsaturated carbonic acid monomer increases, the degree of cross-linking is high and the tensile strength may be lowered. Preferably, the poly(N-isopropylacrylamide) copolymer comprises from more than 80 mol % of the N-isopropylacrylamide monomer to less than 20 mol % ethylenically unsaturated carbonic acid monomer, preferably from 0.5 to 15 moles %, More preferably from 5 to 12 mol %, based on the copolymer. Only within the above-mentioned mol % range, the syneresis in the dip-molding process is gentle, the resulting molded article is less sticky, and the tensile strength is excellent.

In addition, the poly(N-isopropylacrylamide) or its copolymer proposed in the present disclosure can limit the number average molecular weight and the concentration in consideration of syneresis, workability, physical properties of the final molded article, etc., The polymer has an average molecular weight of 5,000 to 80,000 g/mol, and has an aqueous solution concentration of 0.5 to 15% by weight, 1 to 10% by weight, preferably 2 to 5% by weight.

Specifically, the latex composition for dip-molding of the present disclosure is used in an amount of 0.1 to 10 parts by weight, preferably 0.5 to 5 parts by weight, more preferably 1 to 5 parts by weight, based on 100 parts by weight of the carbonic acid-modified nitrile-based copolymer latex do. If the content of the poly(N-isopropylacrylamide) or its copolymer is less than the above range, the thickness of the finally obtained dip-molded article is thin. On the contrary, if the content exceeds the above range, the syneresis sharply decreases and the stability of the latex deteriorates undesirably.

Particularly, the latex composition for dip-molding according to the present disclosure can secure an advantage of excellent tensile strength characteristics even when a dip-molded article is manufactured to a thickness of tens to hundreds of microns.

For example, rubber gloves used for industrial or research purposes have an advantage that the thinner the thickness is, the better the fingertip feeling is, and the fine work can be easily performed. However, when the work is carried out at a low concentration for a thin thickness, the workability is lowered due to the shortening of the syneresis, so that the defective ratio is high during the production of the product, and the finally obtained molded article tears. Thus, the latex composition for dip-molding according to the present disclosure enables the production of a molded article having a thickness of several hundreds of microns or less. For example, it is not only possible to make a rubber glove suitable for fine work, but also to ensure that the rubber glove is excellent in tensile strength and is not torn easily.

At this time, conventional additives used in the dip-molding process may be further added to the latex composition for dip-molding. Such additives include a vulcanizing agent, a vulcanization catalyst, a filler, a crosslinking agent (e.g., an ionic crosslinking agent), a pigment, a thickener, and a pH adjuster.

The additive is used in an amount of 10 parts by weight or less based on 100 parts by weight of latex composition for dip-molding (carbonic acid-modified nitrile-based copolymer latex and poly(N-isopropylacrylamide)), and is suitably adjustable within the range known to those skilled in the art. For example, when the additive is added, the carbonic acid-modified nitrile-based copolymer latex in the latex composition for full dip-molding contains 80 to 99 wt %, preferably 85 to 98 wt %, more preferably 88 to 97 wt % is preferable in view of the physical properties of the glove, which is a kind of dip-molded article of the present disclosure.

The solid concentration of the latex composition for dip-molding according to the present disclosure is 10 to 40% by weight, preferably 15 to 35% by weight, more preferably 15 to 30% by weight. The pH of the latex composition of the present disclosure is 8.0 to 12, preferably 9 to 11, more preferably 9.3 to 10.5.

Dip-Molded Article

Further, a dip-molded article for attaining still another object of the present disclosure is characterized by being obtained by dip-molding the composition.

As a dip-molding method for obtaining a dip-molded article according to any embodiment of the present disclosure, any conventional method may be used, such as a direct immersion method, an anode adhesion immersion method, a Teague adhesion immersion method, etc. Among these, an anode adhesion immersion method is, for example, used since a dip-molded article having a uniform thickness may be easily obtained.

The method of producing a dip-molded article using the composition according to any embodiment of the present disclosure includes the steps of:

a) coating the surface of a mold with a coagulant solution;

b) coating the coagulant-coated mold with a latex composition for dip-molding to form a dip-molded layer;

c) cross-linking the dip-molded layer; and d) Peeling the cross-linked dip-molded layer from the mold to obtain a dip-molded article and then measuring physical properties thereof.

Hereinafter, a method for producing a dip-molded article using a latex composition according to any embodiment of the present disclosure will be described in detail.

Step (a) Coating the Surface of Mold with Coagulant

In this step (a), a process of applying a coagulant to the surface of a mold is carried out by using a hand-shaped mold for dip-molding as a mold, coating the mold with a coagulant solution and then drying the mold.

The examples of coagulant are metal halides such as barium chloride, calcium chloride, magnesium chloride, zinc chloride, aluminum chloride, etc.; nitrates such as barium nitrate, calcium nitrate, zinc nitrate, etc.; acetic acid salts such as barium acetate, calcium acetate, zinc acetate, etc.; sulfate such as calcium sulfate, magnesium sulfate, aluminum sulfate, etc. Among these, calcium chloride and calcium nitrate may be preferred. The coagulant solution is a solution in which the above enumerated coagulant is dissolved in water, alcohol or a mixture thereof. The concentration of coagulant in the coagulant solution is usually from 5 to 50% by weight, for example from 10 to 40% by weight.

Step (b) Forming Dip-Molded Layer in the Mold

Following above step (a), this step (b) is carried out by immersing a coagulant-adhered mold in the latex composition for dip-molding according to any embodiment of the present disclosure to form a dip-molded layer.

The coagulant-adhered mold is immersed in the latex composition for dip-molding made of the latex resin composition according to any embodiment of the present disclosure, and then the mold is taken out to have a dip-molded layer formed in the mold.

Step (c) Cross-Linking Dip-Molded Layer by Heat-Treating

Next, in this step (c), a step of cross-linking the latex resin is carried out by heat-treating the dip-molded layer formed in the mold.

During the heat-treating, the water component first evaporates and curing is done through cross-linking.

Step (d) Obtaining Dip-Molded Article and Measuring the Physical Properties Thereof Subsequently, in this step (d), The dip-molding layer obtained in the step (c) is peeled off from the mold to obtain a dip-molded article, and the physical properties of the obtained dip-molded article are measured.

A dumbbell-shaped specimen is produced from the obtained dip-molded article in accordance with ASTM D-412. The specimen is pulled at an extension rate of 500 mm/min using UTM (Universal Testing Machine) and the tensile strength and elongation at break are measured, and the touch is measured by the stress (modulus) when the elongation is 300% and 500%.

The method according to any embodiment of the present disclosure may be used for any latex article which might be produced by any known dip-molding process. Specifically, it may be applied to any dip-molded latex article selected from health care articles such as surgical gloves, inspection gloves, condoms, catheters or various kinds of industrial and household gloves.

Hereinafter, for a better understanding, the invention is described by way of examples. However, the following examples are provided only to illustrate the invention. Thus, it will be apparent to those skilled in the art that variations and modifications may be made without departing from the scope and spirit of the invention. Furthermore, such variations and modifications are considered to be within the purview and scope of the appended claims.

Example 1

(Production of Carbonic Acid-Modified Nitrile-Based Copolymer Latex)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 2.5 parts by weight of sodium alkylbenzene sulfonate, 0.5 parts by weight of t-dodecyl mercaptan and 140 parts by weight of ion-exchanged water were added to 100 parts by weight of a monomer mixture including 25% by weight of acrylonitrile, 70% by weight of 1,4-butadiene and 5% by weight of methacrylic acid, and the temperature was elevated to 40° C.

After the temperature was elevated, 0.25 parts by weight of potassium persulfate, which is a polymerization initiator, was added thereto. When the conversion reached 95%, 0.1 parts by weight of sodium dimethyl dithiocarbamate was added to terminate the polymerization. Unreacted monomers were removed through a stripping process, and ammonia water, an antioxidant, a defoaming agent, etc. were added to obtain a carboxylated acrylonitrile-butadiene-based copolymer latex having a solid concentration of 45% and a pH of 8.5.

The average particle size and glass transition temperature of the produced latex were measured. The average particle size was measured by Laser Scattering Analyzer (Nicomp), and the glass transition temperature was measured by Differential Scanning Calorimetry.

As a result of the analysis, the glass transition temperature of the prepared latex was −40° C. and the average particle size was 130 nm. The latex prepared as described above was referred to as 'latex-A'.

(Production of Latex Composition for Dip-Molding)

0.5 parts by weight of poly(N-isopropylacrylamide) (Mn: 35,000 g/mol) diluted to 5% was added to 100 parts by weight of the latex-A. A 3% potassium hydroxide solution and an appropriate amount of secondary distilled water were added thereto to obtain a latex composition for dip molding having a solid concentration of 25% and a pH of 10.0.

(Production of Dip-Molded Article)

12 parts by weight of calcium nitrate, 87.5 parts by weight of distilled water and 0.5 parts by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold, to which the coagulant was applied, was immersed in a latex composition for dip-molding produced in above for 1 minute, lifted up out of it, and dried at 80° C. for 1 minute, and then immersed in water or hot water for 3 minutes. The mold was dried again at 80° C. for 3 minutes and then crosslinked at 120° C. for 20 minutes. The crosslinked dip-molded layer was peeled off from the hand-shaped mold to obtain a glove-shaped dip-molded article.

Example 2

Except that 1 parts by weight of poly(N-isopropylacrylamide) was used, the procedure of Example 1 was repeated to prepare a glove-shaped dip-molded article.

Example 3

Except that 2 parts by weight of poly(N-isopropylacrylamide) was used, the procedure of Example 1 was repeated to prepare a glove-shaped dip-molded article.

Example 4

Except that 5 parts by weight of poly(N-isopropylacrylamide) was used, the procedure of Example 1 was repeated to prepare a glove-shaped dip-molded article.

Example 5

Except that 0.5 parts by weight of poly(N-isopropylacrylamide) having a number average molecular weight of 60,000 g/mol was used, the procedure of Example 1 was repeated to prepare a glove-shaped dip-molded article.

Example 6

Except that 1 parts by weight of poly(N-isopropylacrylamide) having a number average molecular weight of 60,000 g/mol was used, the procedure of Example 1 was repeated to prepare a glove-shaped dip-molded article.

Example 7

Except that 2 parts by weight of a poly(N-isopropylacrylamide-co-methacrylic acid) copolymer having a number average molecular weight of 60,000 g/mol was used, the procedure of Example 1 was repeated to prepare a glove-shaped dip-molded article.

Example 8

Except that 5 parts by weight of a poly(N-isopropylacrylamide-co-methacrylic acid) copolymer having a number average molecular weight of 60,000 g/mol was used, the procedure of Example 1 was repeated to prepare a glove-shaped dip-molded article.

Comparative Example 1

Except that latex A was used alone in Example 1, the procedure of Example 1 was repeated to prepare a glove-shaped dip-molded article.

Experimental Example 1: Measurement of Physical Properties of Dip-Molded Article (1) Measurement of Syneresis (Sec)

In order to confirm the syneresis time, a coagulant-applied mold was immersed in the above-described composition for dip-molding for 1 minute, lifted up out of it, dried at 120° C. for 4 minutes, and immersed in water or hot water for 3 minutes. The time at which water droplets fell during drying at 120° C. for 4 minutes was checked and confirmed by the syneresis time.

(2) Measurement of Tensile Strength

According to the ASTM D638 method, the specimen was pulled at a cross head speed of 500 mm/min using a test instrument U.T.M (manufactured by Instron, model name: 4466), and the point, at which the specimen was cut, was measured. The tensile strength was calculated by the following equation:

Tensile strength ($kgf/mm^2$)=load value (kgf)/(thickness (mm)×width (mm))

(3) The Stress at 300% (Modulus, MPa) and the Stress at 500% (MPa)

According to the ASTM D638 method, the specimen was pulled at a cross head speed of 500 mm/min using a test instrument U.T.M (manufactured by Instron, model name: 4466), the stress at 300% and the stress at 500% were measured as follows:

Stress at 300% (MPa)=tensile strength when stretched at three times the initial length of the specimen (1 MPa=0.10197. $Kgf/mm^2$).

Stress at 500% (MPa)=tensile strength when stretched at five times the initial length of the specimen (1 MPa=0.10197. $Kgf/mm^2$).

TABLE 1

|  | Syneresis (sec) | tensile strength (MPa) | Stress at 300% (MPa) | Stress at 500% (MPa) |
|---|---|---|---|---|
| Example 1 | 148 | 31.3 | 5.6 | 16.2 |
| Example 2 | 166 | 34.1 | 5.2 | 13.3 |
| Example 3 | 220 | 31.0 | 5.5 | 14.6 |
| Example 4 | >240 | 34.0 | 5.7 | 15.5 |
| Example 5 | 137 | 32.8 | 5.6 | 15.2 |
| Example 6 | >240 | 34.5 | 5.5 | 13.2 |
| Example 7 | >240 | 34.2 | 5.1 | 12.7 |
| Example 8 | 154 | 31.6 | 5.9 | 14.4 |
| Comparative Example 1 | 136 | 30.9 | 5.3 | 13.0 |

As shown in above Table 1, the dip-molded articles of Examples 1 to 8 using the carbonic acid-modified nitrile latex according to the present disclosure and poly(N-isopropylacrylamide), which is a water-soluble polymer capable of crosslinking, or a copolymer thereof, it was confirmed that the syneresis was gentle and the tensile strength was excellent as compared with the dip-molded article prepared in Comparative Example 1.

A latex composition for dip-molding according to any embodiment of the present disclosure may be used in the production of latex articles including, for example, health care products, such as various industrial and household gloves.

The invention claimed is:

1. A latex composition for dip-molding comprising: a carboxylic acid-modified nitrile-based copolymer latex; and an poly(N-isopropylacrylamide) or a copolymer thereof
    wherein the poly(N-isopropylacrylamide) copolymer is prepared by copolymerization of 80 or more and less than 100 mol % of N-isopropylacrylamide monomer and more than 0 and not more than 20 mole % of an ethylenically unsaturated carboxylic acid monomer.

2. The composition according to claim 1, wherein the carboxylic acid-modified nitrile-based copolymer latex has a glass transition temperature of −50 to −15° C. and an average particle diameter of 90 to 200 nm.

3. The composition according to claim 1, the poly(N-isopropylacrylamide) or copolymer thereof has a number average molecular weight of 5,000 to 80,000 g/mol.

4. The composition according to claim 1, the poly(N-isopropylacrylamide) or copolymer thereof is used as an aqueous solution having a concentration of 0.5 to 15% by weight.

5. The composition according to claim 1, wherein the ethylenically unsaturated carboxylic acid monomer is selected from the group consisting of acrylic acid, methacrylic acid, itaconic acid, maleic acid, fumaric acid and combinations thereof.

6. The composition according to claim 1, comprising 0.1 to 10 parts by weight of the poly (N-isopropylacrylamide) or copolymer thereof with respect to 100 parts by weight of the carboxylic acid-modified nitrile-based copolymer.

7. The composition according to claim 1, wherein the carboxylic acid-modified nitrile-based copolymer is prepared by polymerization of monomers mixture comprising 40 to 89% by weight of a conjugated diene monomer, 10 to 50% by weight of an ethylenically unsaturated nitrile-based monomer and 0.1 to 10% by weight of an ethylenically unsaturated acid monomer.

8. The composition according to claim 7, wherein the conjugated diene monomer includes one selected from the group consisting of 1,3-butadiene, 2,3-dimethyl-1,3-butadiene, 2-ethyl-1,3-butadiene, 1,3-pentadiene, isoprene, and combinations thereof.

9. The composition according to claim 7, wherein the ethylenically unsaturated nitrile-based monomer includes one selected from the group consisting of acrylonitrile, methacrylonitrile, fumaronitrile, α-chloronitrile, α-cyanoethyl acrylonitrile, and combinations thereof.

10. The composition according to claim 7, wherein the ethylenically unsaturated acid monomer includes one selected from the group consisting of acrylic acid, methacrylic acid, itaconic acid, maleic acid, fumaric acid, maleic anhydride, citraconic anhydride, styrene sulfonic acid, monobutyl fumarate, monobutyl maleate, mono-2-hydroxypropyl maleate, and combinations thereof.

11. The composition according to claim 1, further comprising one additive selected from the group consisting of a vulcanizing agent, a vulcanization catalyst, a filler, a crosslinking agent, a pigment, a thickener, a pH adjusting agent and a combination thereof.

12. A dip-molded article produced by dip-molding of the latex composition for dip-molding according to claim 1.

13. A method of preparing a dip-molded article, said method comprising:
   A) applying a coagulant solution to a mold and drying;
   B) applying a latex composition for dip-molding to a mold to which the coagulant has been applied to form a dip-molding layer;
   C) crosslinking the dip molding layer; and
   D) peeling off the cross-linked dip-molded layer from the mold to obtain a dip-molded article, wherein the latex composition for dip-molding is the latex composition for dip-molding according to claim 1.

* * * * *